(12) United States Patent
Beyer et al.

(10) Patent No.: US 6,978,249 B1
(45) Date of Patent: Dec. 20, 2005

(54) PROFILE-BASED PRODUCT DEMAND FORECASTING

(75) Inventors: Dirk M. Beyer, Mountain View, CA (US); Fereydoon Safai, Los Altos Hills, CA (US); Farid AitSalia, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1017 days.

(21) Appl. No.: 09/626,191

(22) Filed: Jul. 28, 2000

(51) Int. Cl.[7] .............................................. G06F 17/60
(52) U.S. Cl. ................................ 705/10; 705/7; 705/1
(58) Field of Search ............................... 705/10, 7, 22, 705/28, 1

(56) References Cited

U.S. PATENT DOCUMENTS

| | | | | |
|---|---|---|---|---|
| 5,712,985 A | * | 1/1998 | Lee et al. ...................... | 705/7 |
| 5,819,232 A | * | 10/1998 | Shipman ....................... | 705/8 |
| 5,963,919 A | * | 10/1999 | Brinkley et al. .............. | 705/28 |
| 6,032,121 A | * | 2/2000 | Dietrich et al. ............... | 705/8 |
| 6,032,125 A | * | 2/2000 | Ando ........................... | 705/10 |
| 6,151,582 A | * | 11/2000 | Huang et al. ................. | 705/8 |
| 6,205,431 B1 | * | 3/2001 | Willemain et al. ........... | 705/10 |
| 6,341,269 B1 | * | 1/2002 | Dulaney et al. .............. | 705/22 |
| 6,366,890 B1 | * | 4/2002 | Usrey .......................... | 705/10 |
| 6,609,101 B1 | * | 8/2003 | Landvater .................... | 705/10 |

FOREIGN PATENT DOCUMENTS

| | | | | |
|---|---|---|---|---|
| JP | 410315100 A | * | 12/1998 | .......... B23Q 41/08 |

OTHER PUBLICATIONS

Screenshots of Technology Strategy, Inc., www.grossprofit.com, Mar. 2, 2000 [retrieved on Jun. 9, 2003], pp. 1-5, retrieved from: Google.com and archive.org.*

Koloszyc, Ginger, "Merchants Try Complex Mathmatical Tools to Improve Inventory Decisions", Stores Magazine, Nov. 1999 [retrieved Jun. 9, 2003], pp. 1-3, retrieved from: Google.com and archive.org.*

Ackerman, Jerry, "Looking Back to Fashion's Future", The Boston Globe, Oct. 7, 1998 [retrieved Jun. 9, 2003], pp. 1-4, retrieved from: archive.org and Google.com.*

Safai et al., "Implementing setup optimization on the shop floor", Operations Research Society, Nov./Dec. 1996 [retrieved Jun. 9, 2003], 1 page, retrieved from: Dialog, file 15.*

Mendenhall et al., "A Second Course in Statistics", Prentice-Hall, Inc., 1996, 5th Edition, pp. 29-46 and 696-710.* i2 Technologies, "Rhythm Software", www.i2.com, Jun. 18, 2000 [retrieved Jul. 18, 2005], 23 pages, retrieved from: archive.org.*

* cited by examiner

*Primary Examiner*—Tariq R. Hafiz
*Assistant Examiner*—B. Van Doren

(57) ABSTRACT

A product demand forecasting system includes a profile extractor that generates a demand profile of a new product yet to be introduced based on demand profiles of similar products already introduced. The profile extractor normalizes and averages the demand profiles of the similar products to obtain the demand profile of the new product. The forecasting system also includes a life-cycle demand predictor that generates a total life-cycle demand of the new product based on historical demand data of the similar products. A forecast creator is then coupled to the profile extractor and the demand predictor to generate a life-cycle demand forecast for the new product based on the demand profile and total life-cycle demand of the new product. A method of providing a life-cycle product demand forecast for a new product yet to be introduced is also described.

11 Claims, 6 Drawing Sheets

PROFILE-BASED PRODUCT DEMAND FORECASTING

BACKGROUND OF THE INVENTION

1. Field of the Invention

The present invention pertains to product demand forecasting. More particularly, this invention relates to a computer-implemented profile-based product demand forecasting system and a method thereof.

2. Description of the Related Art

As the world advances in technology, more and more new products are being introduced to replace older or technologically obsolete products. This tends to shorten product life-cycle for the products that are on the market. However, the shortened product life-cycle of a product adversely affects the profitability of the product. Thus, in order to maximize the profitability of a product with a shortened life-cycle, the manufacturer needs to reduce cost associated with producing and marketing the product. One way of reducing the cost is to minimize inventory of the product. This typically requires accurate forecast or prediction of future demand of the product. If the forecast is below the actual demand, the manufacturer may experience loss of sales. This may significantly affect the profitability of the product, particularly if the product is at the beginning of its life-cycle where profit margins are high. If the forecast exceeds the actual demand, the manufacturer may end up with a huge inventory of obsolescent and quickly depreciating product, particularly if the product is at the end of its life-cycle.

However, there is in general very little historical demand data available for predicating or forecasting the future demand of a product with a shortened product life-cycle. In addition, if a product has not been introduced, there will not be any historical demand data for the new product. Proposals have been made to use the demand data of similar products sold in the past to forecast the demand of the new product. There are, however, many problems associated with this prior proposal. One problem is that the demand data of similar products do not reflect the exact market condition under which the new product will be sold. Another problem is that even among the similar products, a newer product typically has a shorter product life-cycle than an older product. This causes different products to have different product life-cycle demand curves. In addition, the average sales rate for different products may be different from one another due to the change in technology and the rate at which a new product is being accepted by consumers. This typically produces different average sales rates.

Prior solutions have been proposed to solving these problems. One prior solution is referred to as time-series forecasting method. This method adds up all sales for a certain period in a certain market segment (e.g., high end servers). Then the method generates the demand curve based on monthly sales figures. The method can then (1) put a trend line on the demand curve, (2) generate a moving average to predict the trend, or (3) use known smoothing techniques to obtain the forecast.

However, this prior solution bears disadvantages. One disadvantage is that although the forecasts are relatively accurate on an aggregated level, the breakdown to the Stock-Keeping Unit (SKU) level is difficult and is a main source of error. SKU refers to the same end product unit boxed for sale. For example, the generic high end server computer may be available for sale at different memory and/or CPU speed configurations. In this case, there will different SKUs to track different configurations. The efficient use of this method depends on the stability of the ratios of demand of different products. In a short life-cycle situation, the ratios change rapidly.

Another prior proposal is referred to as time-series forecasting method on SKU. This method is similar to the above-described method, except that it looks at one particular SKU. However, this prior solution still bears disadvantages. One disadvantage is that there are a lot of noise from the actual randomness of demand, making the forecast unreliable. Another disadvantage is that it requires historic data for the forecasting. This also makes the prior method inapplicable for forecasting the demand of new products with short life-cycle because historic data are scarce in a short life-cycle environment.

Other prior solutions include the traditional manual approach in which human planners or forecasters predict the product demand using business judgment and "best guesses". The manual forecasting is very labor intensive. The success of forecasting also depends crucially on the abilities and knowledge of the human forecasters. It typically does not provide accurate product demand forecast.

SUMMARY OF THE INVENTION

One feature of the present invention is to forecast the demand of a product more accurately.

Another feature of the present invention is to provide a product demand forecasting system for a new product that has not yet been introduced.

A further feature of the present invention is to use product demand information of similar products already introduced to forecast the demand of a new product yet to be introduced.

A still further feature of the present invention is to normalize or standardize the product demand information of similar products to forecast the product demand of a new product.

A still further feature of the present invention is to use recent product demand information of a product to adjust the product demand forecast of that product.

A product demand forecasting system includes a profile extractor that generates a demand profile of a new product yet to be introduced based on demand profiles of similar products already introduced. The profile extractor normalizes and averages the demand profiles of the similar products to obtain the demand profile of the new product. The forecasting system also includes a life-cycle demand predictor that generates a total life-cycle demand of the new product based on historical demand data of the similar products. A forecast creator is then coupled to the profile extractor and the demand predictor to generate a life-cycle demand forecast for the new product based on the demand profile and total life-cycle demand of the new product.

A method of providing a life-cycle product demand forecast for a new product yet to be introduced includes the step of collecting historical demand data of similar products of the new product. The similar products have already been introduced. The demand profiles of the similar products are generated based on the historical data of the similar products. The demand profiles are normalized and averaged to obtain a demand profile of the new product. A total life-cycle demand of the new product is generated based on the historical demand data of the similar products. The life-cycle product demand forecast for the new product is then obtained based on the demand profile and total life-cycle demand of the new product.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
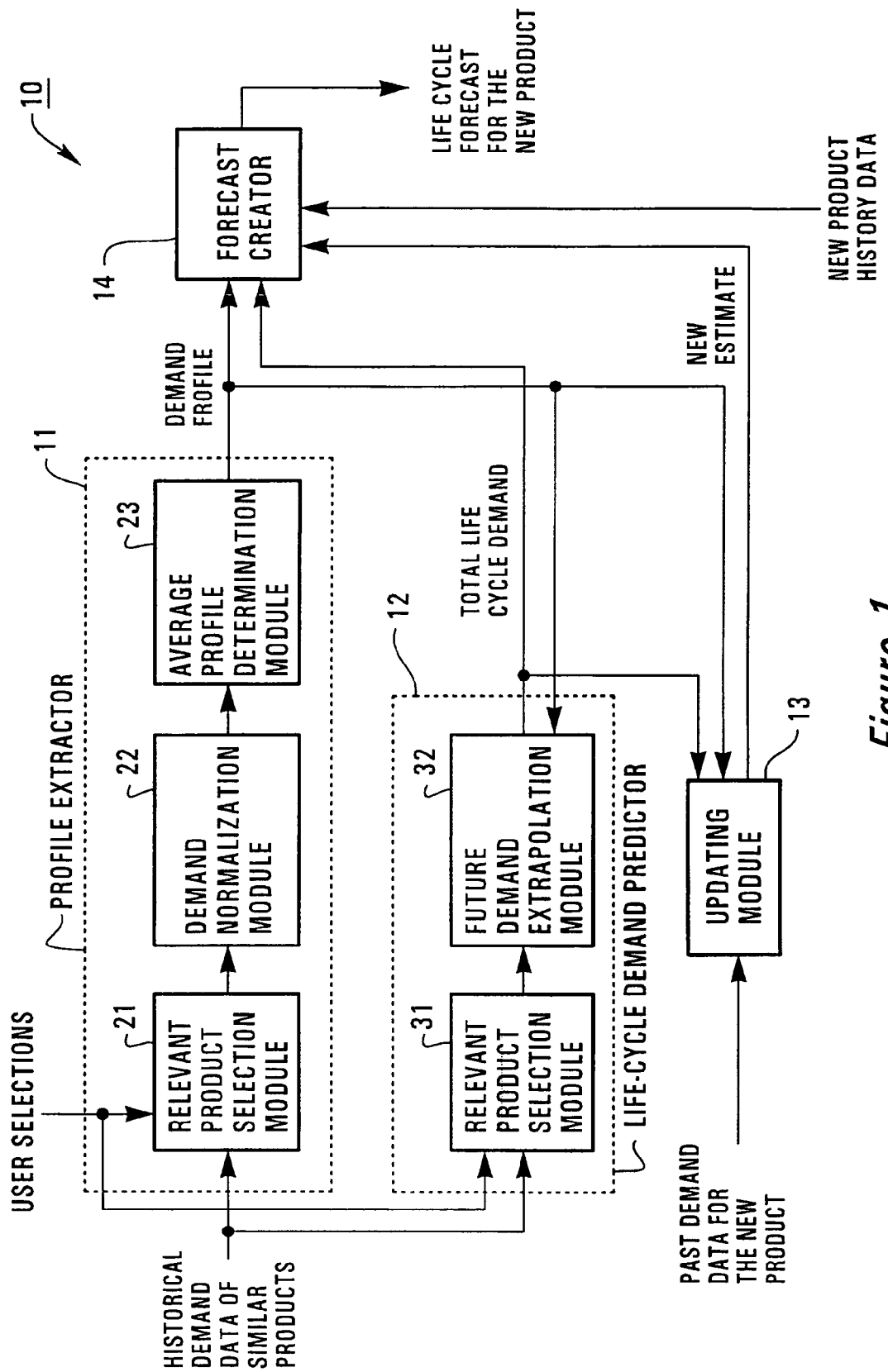
FIG. 1 schematically shows a profile-based product demand forecasting system that implements one embodiment of the present invention.

FIG. 1 shows a profile-based product demand forecasting system 10 that implements one embodiment of the present invention. In one embodiment, the forecasting system 10 is a software system implemented in a computer system.

The computer system that embodies the forecasting system 10 can be any kind of computer system. For example, the computer system can be a main-frame computer system, a workstation computer system, a server computer system, or a personal computer system.

As will be described in more detail below, the forecasting system 10 is an integrated forecasting system. It employs a combination of life-cycle profiling, time-series forecasting, and Bayesian updating techniques to produce a demand forecast for each period of the life of a yet-to-be-introduced new product with a short life-cycle. The forecasting system 10 generates the new product forecast based on the assumption that different products of the same product family share certain characteristics in their life-cycles, although each individual product has its own life-cycle demand curve. As one can observe from historical data, although even very similar products can have significantly different life-cycle curves in terms of demand and length, their monthly demand over the life-cycle often follows a similar shape if the life-cycle length and cumulative demand are normalized for comparison.

The forecast by the forecasting system 10 is done with the only human intervention of selecting the similar products of the new product. The user interaction or intervention with the forecasting system 10 is conducted through a user interface (not shown in FIG. 1) of the forecasting system 10. The user interface can be implemented using known technology. The forecasting system 10 produces forecasts that are more accurate than using the prior approaches. The structure of the forecasting system 10 is described below.

The forecasting system 10 includes a profile extractor 111 that generates a demand profile of the new product based on historical demand data of similar products already introduced. The similar products are selected by the user of the forecasting system 10 and inputted into the forecasting system 10 by the user through the user interface of the forecasting system 10. Alternatively, the user does not select the similar products. Instead, the user only describes the new product and the profile extractor 11 determines the similar products based on the user description of the new product.

The similar products are past products that are no longer available. The similar products can be functionally same products, but with different model numbers or configurations (e.g., D4864 Å, D4863 Å, D4859 Å, D4861 Å, etc.). The similar products can also be functionally similar products.

After the user selects and inputs information of the similar products, the profile extractor 11 retrieves or collects the historical demand data of the similar products from an external historical demand data database (not shown in FIG. 1). The database stores the historical demand data of a large number of products. The profile extractor 11 then calculates the cumulative demand profile of each of the similar products. The cumulative demand profile is a demand curve over life-cycle of the product generated based on the historical demand data of the product over time.

The profile extractor 11 then normalizes or standardizes each cumulative demand profile for length of life and total life-cycle demand. The profile extractor 11 does this by discretizing the cumulative demand profile at a pre-specified number of equidistant points between zero and 100% of the product's life. Then the profile extractor 11 calculates the empirical mean and the empirical standard deviation of the cumulative profiles of all of the similar products at these points. This yields an average product profile and measures for the variability of the profile. The average profile is treated as the demand profile of the new product. The profile extractor 11 then sends the demand profile to a forecast creator 14 of the forecasting system 10.

Alternatively, the forecasting system 10 includes an internal data store (not shown in FIG. 1). All the modules send and receive data from the internal data store. In this case, the demand profile data of the new product generated by the profile extractor 11 is first stored in the internal data store before being used by the forecast creator 14. The profile extractor 11 will be described in more detail below, also in conjunction with FIGS. 2–3.

Referring again to FIG. 1, the forecasting system 10 also includes a life-cycle demand predictor 12. The life-cycle demand predictor 12 generates a total life-cycle demand estimate of the new product based on historical demand data of the similar products. As described above, the similar products are directly determined by the user of the forecasting system 10 or determined by the forecasting system 10 based on the user input description of the new product.

After the user selection of the similar products, the life-cycle demand predictor 12 retrieves or collects the historical demand data of the similar products from the external historical demand data database. For each similar product, the life-cycle demand predictor 12 calculates the run-rate (i.e., the average demand per time period during the mature phase of the product's life) and associates it with the date that represents the midpoint of the product's life. The run-rate can be units sold per month. Using linear regression and extrapolation on the date-run-rate pairs, the life-cycle demand predictor 12 calculates an estimate of the run-rate at the date of the midpoint of the life-cycle of the new product. From the predicted run-rate and the product demand profile of the new product (i.e., the average product profile of the similar products), the life-cycle demand predictor 12 finally computes an estimate for the total life-cycle demand of the new product. This estimate is either sent to the forecast creator 14 or stored in the internal data store. The regression/ extrapolation approach also yields confidence intervals for the estimate. In addition, the life-cycle demand predictor 12 also approximates the distribution of the total life-cycle demand by a given class of probability distributions (Normal, Weibull, . . . ) which allows to estimate the parameters of these distributions from the confidence intervals.

The following equation shows how to calculate the estimated total life-cycle demand of the new product based on the expected average run-rate R. If the mature phase starts in month $M_0$ and ends in month $M_1$, the expected or estimated total life-cycle demand can be calculated as follows.

$$D=R(M_0-M_1+1)/[CP(M_1/T)-CP((M_0-1)/T)].$$

Wherein CP(.) represents the demand profile of the new product (i.e., the average demand profile of the similar products) at a given point of time and T is the length of the life of the product in months. The choice of the parameters $M_0$ and $M_1$ is not crucial for the validity of the calculations as long as they stay away from ramp-up and ramp-down of the demand at the beginning and end of the product's life. In one embodiment, $M_0$ can be 0.25 and $M_1$ can be 0.75. The life-cycle demand predictor 12 will be described in more detail below, also in conjunction with FIGS. 2 and 4.

Referring again to FIG. 1, the forecasting system 10 also includes an updating module 13. The updating module 13 is employed to provide a revised total life-cycle demand estimate as demand information of the new product becomes available over time after product introduction of the new product. The updating module 13 employs any known updating mechanism to produce the revised total life-cycle demand estimate (i.e., new estimate). For example, the updating module 13 can employ the Bayesian updating technique to produce the revised total life-cycle demand estimate. Using the Bayesian updating technique, the updating module 13 calculates a posterior probability distribution for the total life-cycle demand from the cumulative demand of the new product given so far and the total life-cycle demand estimate produced by the life-cycle predictor 12. The revised total life-cycle demand estimate is also supplied to the forecast creator 14 or stored in the internal data store and made available to the forecast creator 14.

Figure 6:
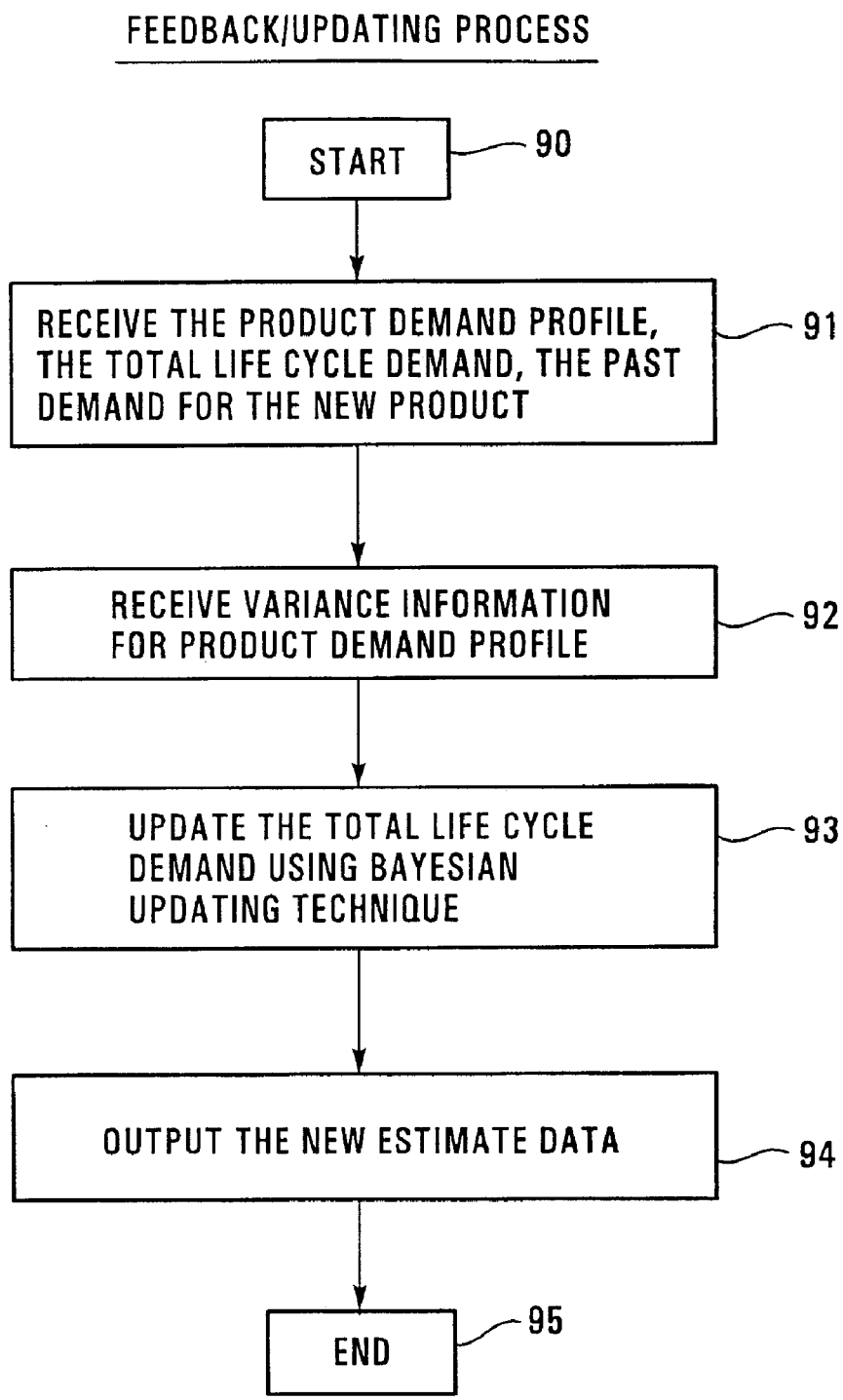
FIG. 6 a flowchart diagram showing the updating process of the updating module of FIG. 1.

FIG. 6 shows the updating process of the updating module 13, which will be described in more detail below.

Referring again to FIG. 1, the forecast creator 14 of the forecasting system 10 receives the demand profile of the new product from the profile extractor 11. The forecast creator 14 also receives the total life-cycle demand of the new product from the life-cycle demand predictor 12. In addition, the forecast creator 14 receives the new product history data from the user of the forecasting system 10. The new product history data specify the start and removal dates of the new product. The start date is the product introduction date of the new product. The new product history data are supplied to the forecast creator 14 from the user via the user interface. Based on the data received, the forecast creator 14 generates the life-cycle forecast for the new product. The forecast creator 14 generates the life-cycle forecast of the new product by reversing the normalization of the demand profile of the new product (i.e., the average product demand profile of the similar products) generated by the profile extractor 11. In doing so, the forecast creator 14 takes into account any observed past demand data (i.e., the revised total life-cycle demand estimate from the updating module 13) for the new product. The forecast creator 14 also distributes the difference between the cumulative past (i.e., the revised total life-cycle demand estimate from the updating module 13) and the total life-cycle demand estimate.

The operation of the forecast creator 14 is described as follows. The forecast creator 14 inverts the normalization procedure of the demand profile of the new product to obtain the expected cumulative demand for the new product in the time [0, t]. Here, t represents the cutoff time of the forecast. Assuming 1 represents the new product, the cumulative demand C for the product 1 can be calculated using the following equation:

$$C_l(t)=CP(t/T) \times D.$$

Here, CP(t/T) represents cumulative demand profile of the product 1 at a given point in time. D represents the total life-cycle demand estimate of the similar products. Thus, the demand in month m can be calculated by $$D_l(m)=C_l(m)-C_l(m-1).$$

If error bounds on D are known, error bounds on the monthly demand can also be calculated.

Figure 5:
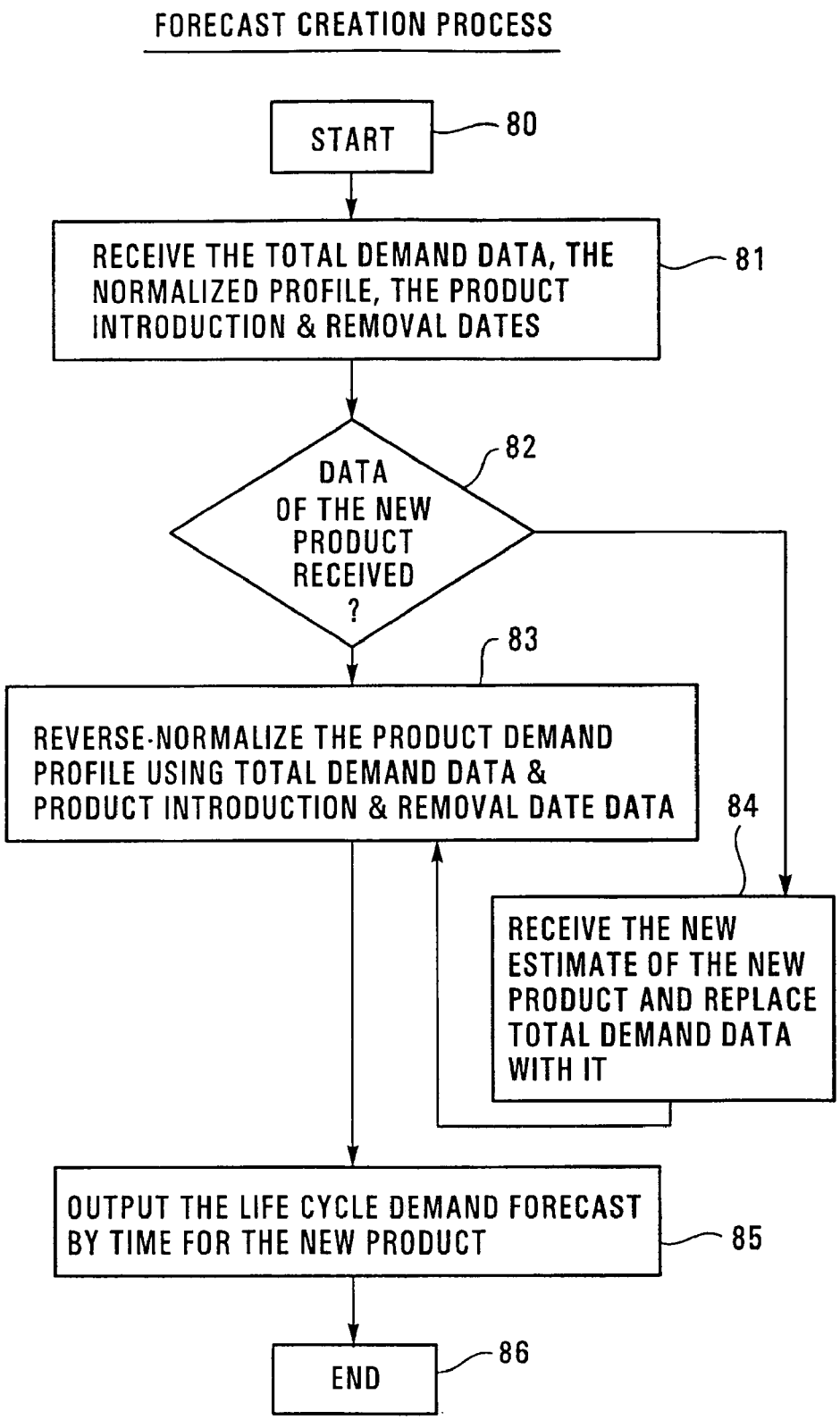
FIG. 5 is a flowchart diagram showing the forecast creating process of the forecast creator of FIG. 1.

The resulting forecast from the forecast creator 14 can be displayed to the user of the forecasting system 10 through the interface of the forecasting system 10. The forecast can also be output to an external database or storage (not shown in FIG. 1). FIG. 5 shows the process of generating the life-cycle forecast for the new product by the forecast creator 14, which will be described in more detail below.

Referring again to FIG. 1, the profile extractor 11 includes a relevant product selection module 21 that receives the user selection of the similar products already introduced, and collects the historical demand data of the user-selected similar products. The similar products are those products that share the same or similar properties as the new product, or belong to same or similar product family of the new product. For example, a new personal computer with a 500 MHz microprocessor is similar to personal computers or notebook computers with microprocessors of 100 MHz to 400 MHz, but not similar to server computers or workstation computers of substantially higher speeds and/or memory capacity.

Alternatively, the relevant product selection module 21 selects or determines the similar products of the new product based on the user input (i.e., user description) of the new product. In this case, the user input or description of the new product includes properties of the new product and the relevant product selection module 21 determines the similar products based on the properties of the new product described in the user input. In another embodiment, the user input can be as to what product group the new product belongs. The relevant product selection module 21 then determines the similar products based this factor. Alternatively, the relevant product selection module 21 determines the similar products based on a combination of factors of the new product.

Figure 2:
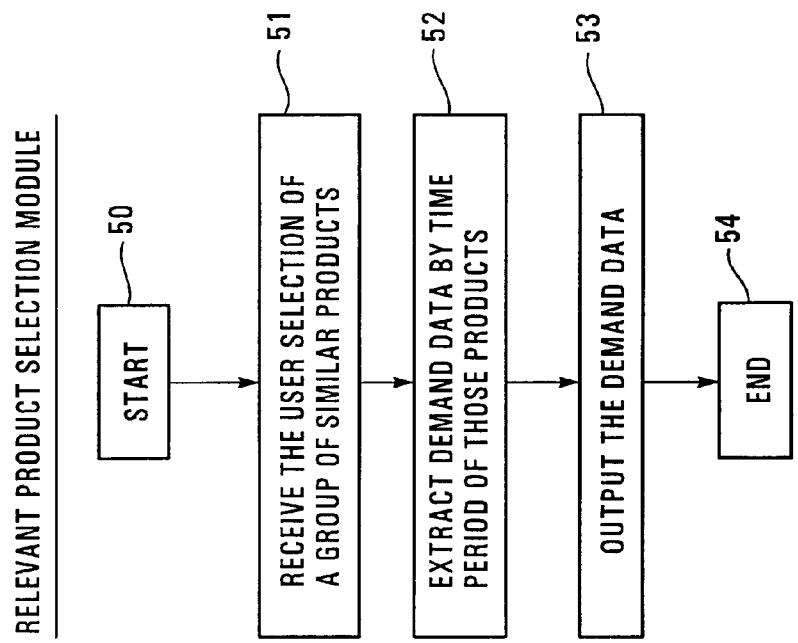
FIG. 2 is a flowchart diagram showing the relevant product selection process of the selection modules of FIG. 1.

The relevant product selection module 21 receives all external data through the user interface of the forecasting system 10. The relevant product selection module 21 can be implemented using any known means. FIG. 2 shows the operation of the relevant product selection module 21, which will be described in more detail below.

As can be seen from FIG. 2, the process of the relevant product selection module 21 starts at the step 50. At the step 51, the relevant product selection module 21 receives the user selection of the similar products. At the step 52, the relevant product selection module 21 extracts or collects the historical demand data by time period of those similar products. At the step 53, the relevant product selection module 21 outputs the demand data and the process ends at the step 54.

Referring back to FIG. 1, the relevant product selection module 21 supplies the historical demand data of the similar products to the demand normalization module 22. The demand normalization module 22 generates the cumulative demand profile of each of the similar products. In addition, the demand normalization module 22 normalizes or standardizes each of the cumulative demand profile curves of the similar products for length of life and total life-cycle demand. The demand normalization module 22 does this by discretizing the cumulative demand profile at a pre-specified number of equidistant points between zero and 100% of the product's life. The normalization process is known and does not need to be described in more detail. In addition, the demand normalization module 22 can be implemented using known technology.

The normalization process uses cumulative demand data rather than monthly demand data in order to avoid certain difficulties arising when working directly with monthly demand. For example, order demand data sets contain negative entries of months when cancellation of previous orders outnumber those in the current one, thus leading to negative percentages in the scaling argument (dividing by total demand). In addition, cumulative demand is independent of the unit of time used for data collection (e.g., monthly, weekly, etc.).

The normalization process is as follows. First, choose a similar product k for which the complete life-cycle demand data are available. Let the length of the life of that product be $T_k$. Let $C_k(t)$ be the total demand up to time t. Obviously, $C_k(T_k)$ is the total life-cycle demand. Then, the normalization is achieved by dividing the cumulative monthly demand by the total life-cycle demand (i.e., $C_k(t)/C_k(T_k)$). It shall be noted that this step of normalization eliminates the effect of volume differences in total life-cycle demands of different products.

Secondly, the time axis is re-scaled to represent the fraction of the total duration of the life-cycle to obtain the cumulative demand profile for product k:

$$CP_k(t/T_k) = C_k(t)/C_k(T_k).$$

This second step eliminates the effect of different length of product life-cycles. The function $CP_k(t/T_k)$ is defined so far for the discrete values $1/T_k, 2/T_k, \ldots, (T_k-1)/T_k, 1$ only. By linear interpolation, a continuous function on the interval [0, 1] can be obtained where the argument stands for the fraction of the life-cycle and the value represents the fraction of the total demand realized up to that point in time ($CP_k(0.6)=0.8$ means that after 60% of the life of product k, 80% of its demand has occurred).

The normalization of each of the cumulative demand profiles of the similar products allows the average profile determination module 23 to generate the demand profile of the new product based on the normalized or standardized cumulative demand profiles of the similar products. As described above, the cumulative demand profiles of different products of the same product family or group often follow a similar shape if the life-cycle length and cumulative demand are normalized for comparison. This means that the product demand curves over product life of similar products can be compared if the curves are standardized or normalized in terms of their lengths and heights. In other words, the normalized cumulative demand profiles of the similar products, once averaged, relatively accurately represent the demand profile of the new product. The averaging operation is performed by the average profile determination module 23, which will be described in more detail below.

The normalized cumulative demand profiles are supplied to the average profile determination module 23 to generate the average product demand profile of the similar products. As described above, the average product demand profile is regarded as the demand profile of the new product. The average profile determination module 23 generates the average product demand profile of the similar products by calculating the empirical mean and the empirical standard deviation of the cumulative profiles of all of the similar products at the equidistant points. The calculation is done using known mathematical theories for statistics which will not be described in more detail below. The calculation then yields the average product profile and measures for the variability of the profile.

For example, if historical data are available for similar products 1, 2, ... N, then the average cumulative demand (i.e., demand profile of the new product) is calculated using the following equation:

$$CP(s) = 1/N \times \sum_{K=1}^{N} P_k(s).$$

Figure 3:
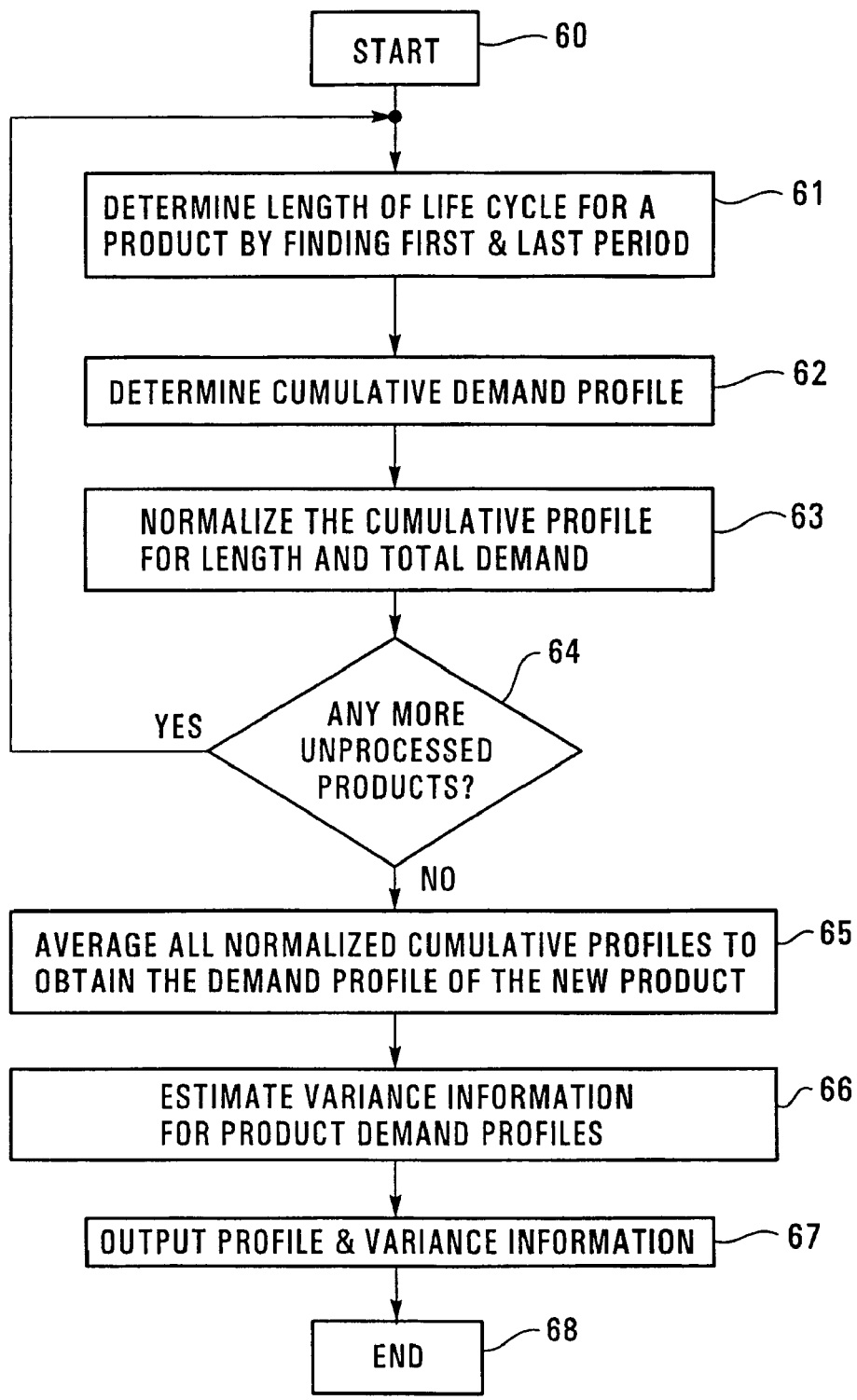
FIG. 3 is a flowchart diagram showing the normalization and average determination process of the normalization module and the average profile determination module of FIG. 1.

In one embodiment, the demand normalization module 22 and the average profile determination module 23 are implemented as two separate modules. In another embodiment, the two modules 22–23 can be implemented by software as a single module that performs both the normalization function and the averaging function. FIG. 3 shows the operation of the two modules 22–23 as an integrated module, which will be described in more detail below. It is to be noted that FIG. 3 only shows the combined normalization and averaging process or operation. FIG. 3 does not show the generation of each cumulative demand profile.

Referring to FIG. 3, the normalization process starts at the step 60. At the step 61, the demand normalization module 22 determines length of life-cycle for a similar product by finding first and last time period of the product. At the step 62, the demand normalization module 22 determine the cumulative demand profile of that product. At the step 63, the demand normalization module 22 normalizes or standardizes the cumulative demand profile of that product for length and total demand. Then the process moves to the step 64, at which the demand normalization module 22 determines whether there are unprocessed similar products. If so, the steps 61–63 are repeated. If not, the step 65 is the next step.

At the step 65, the average profile determination module 23 averages all normalized cumulative demand profiles to obtain the average product demand profile of the similar products as the demand profile of the new product. The step 66 is then performed at which the average profile determination module 23 estimates variance information for the demand profiles. As described above, the variance information includes the empirical mean and the empirical standard deviation. At the step 67, the average profile determination module 23 outputs the average demand profile and the variance information. The process then ends at the step 68.

Referring back to FIG. 1, the life-cycle demand predictor 12 includes a relevant product selection module 31 and a future demand extrapolation module 32. The relevant product selection module 31 performs the same function and receives the same data as the relevant product selection module 21 of the profile extractor 11. Thus, the relevant product selection module 31 will not be described in more detail below.

Figure 4:
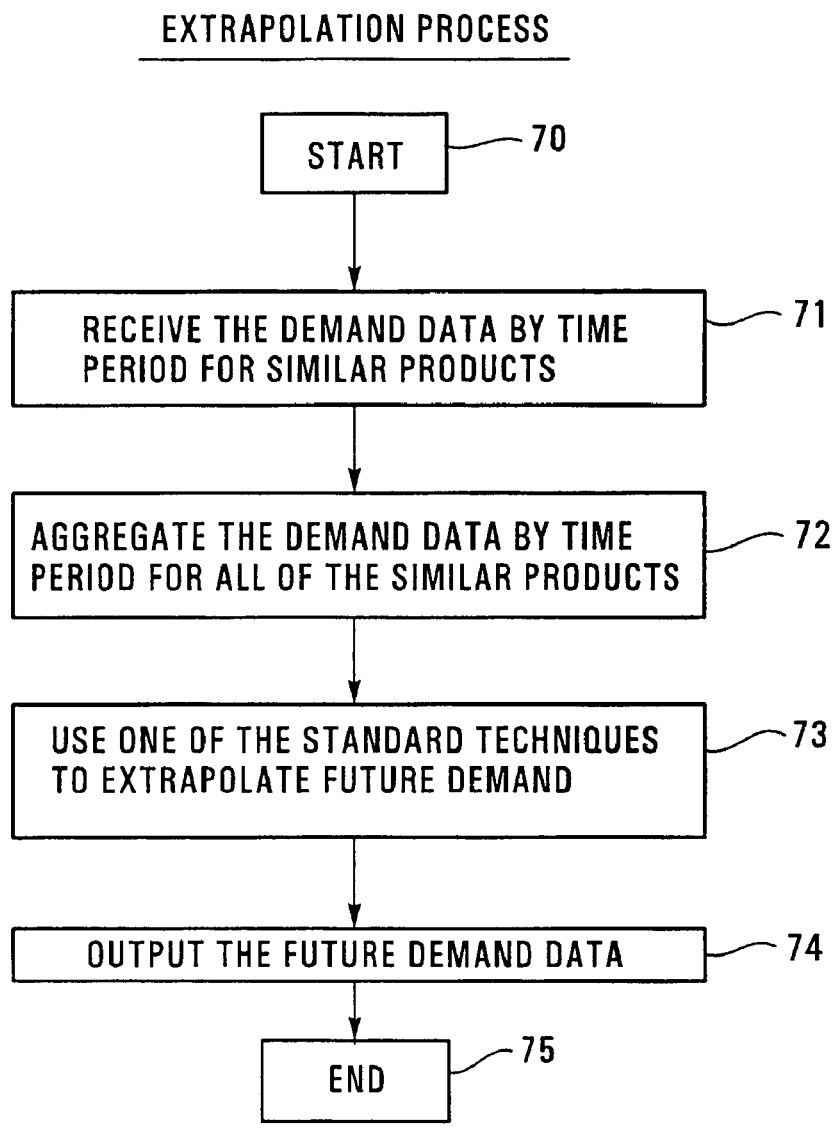
FIG. 4 is a flowchart diagram showing the extrapolation process of the extrapolation module of FIG. 1.

The future demand extrapolation module 32 receives the historical demand data of the similar products from the relevant product selection module 31. The future demand extrapolation module 32 generates the total life-cycle demand estimate of the new product based on the historical demand data of the similar products. FIG. 4 shows the extrapolation process of the future demand extrapolation module 32, which will be described in more detail below. The future demand extrapolation module 32 can be implemented using any known technology.

Referring to FIG. 4, the process starts at the step 70. At the step 71, the future demand extrapolation module 32 receives the demand data by time period for the similar products from the relevant product selection module 31. At the step 72, the future demand extrapolation module 32 aggregates the demand data by time period for all of the similar products. At the step 73, the future demand extrapolation module 32 uses one of the standard extrapolation techniques to extrapolate future demand estimate of the new product. For example, the future demand extrapolation module 32 calculates, for each similar product, the run-rate (i.e., the average demand per time period during the mature phase of the product's life) and associates it with the date that represents the midpoint of the product's life. Using linear regression and extrapolation on the date-run-rate pairs, the future demand extrapolation module 32 calculates an estimate of the run-rate at the date of the midpoint of the life-cycle of the new product. From the predicted run-rate and the product demand profile of the new product (i.e., the average product profile of the similar products), the future demand extrapolation module 32 finally computes an estimate for the total life-cycle demand of the new product. The regression/extrapolation approach also yields confidence intervals for the estimate.

The future demand extrapolation module 32 outputs the future demand data at the step 74. The process then ends at the step 75.

FIG. 5 shows the forecast creating process of the forecast creator 14 of FIG. 1. As can be seen from FIG. 5, the process of the forecast creator 14 (FIG. 1) starts at the step 80. At the step 81, the forecast creator 14 receives the total demand data of the similar products, the normalized average product demand profile of the similar products, and the new product history data (i.e., the introduction and removal dates of the new product). At the step 82, the forecast creator 14 determines if any demand data or estimates of the new product are available from the updating module 13. If so, the step 84 is performed at which the forecast creator 14 receives the new estimate and replaces the original total demand data with it.

If, at the step 82, it is determined that no past demand data of the new product is available, then the step 83 is the next step. At the step 83, the forecast creator 14 reverse normalizes (or inverts the normalization) the product demand profile (i.e., the average product demand profile of the similar products) using the total demand data and the new product history data (i.e., the new product introduction and removal date data).

At the step 85, the forecast creator 14 outputs the life-cycle demand forecast by time for the new product. The process then ends at the step 86.

FIG. 6 shows the updating process of the updating module 13. As can be seen from FIG. 6, the updating process of the updating module 13 starts at the step 90. At the step 91, the updating module 13 receives the demand profile of the new product (i.e., the average product demand profile of the similar products), the total life-cycle demand of the similar products, and the past demand data for the new product.

At the step 92, the updating module 13 receives the variance information for the demand profile of the new product. At the step 93, the updating module 13 updates the total life-cycle demand of the similar products using, for example, the Bayesian updating technique. The Bayesian approach takes into account the old estimate as well as new demand observation. Both the estimate of the total life-cycle demand D and the demand profile of the new product at a given point in time CP(t/T) are treated as random variables. The cumulative demand up to time t (i.e., C(t)) can be seen as random variable which satisfies $$C(t) = CP(t/T) \times D.$$

At time t, we can observe the value of C(t), say c, and subsequently replace the original probability distribution of D by its conditional distribution for C(t)=c. This approach strikes a balance between old and new information. It takes into account both the new and old information and weighs them by the level of confidence in them which is expressed by their standard deviation.

At the step 94, the updating module 13 outputs the new demand estimate of the new product. This new estimate is the fine-tuned forecast of the new product. The process then ends at the step 95.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A product demand forecasting system, comprising
   a profile extractor that generates a demand profile of a new product yet to be introduced based on demand profiles of similar products already introduced, wherein the profile extractor normalizes and averages the demand profiles of the similar products to obtain the demand profile of the new product;
   a life-cycle demand predictor that generates a total life-cycle demand of the new product based on historical demand data of the similar products;
   a forecast creator coupled to the profile extractor and the demand predictor to generate a life-cycle demand forecast for the new product based on the demand profile and total life-cycle demand of the new product; and
   a future demand extrapolation module coupled to the forecast creator to extrapolate the total life-cycle demand of the new product by calculating an average demand per time period of each of the similar products, associating each average demand per time period with a date that represents a midpoint of the life-cycle of each similar product, and calculating an estimate of the average demand per time period at the date of the midpoint of the life-cycle of the new product.

2. The product demand forecasting system of claim 1, wherein the profile extractor further comprises a relevant product selection module that selects the similar products and extracts the historical demand data of the similar products from an external historical demand database; and a demand normalization and average profile determination module that calculates and normalizes the demand profile of each of the similar product, and averages all the normalized demand profiles to obtain the demand profile of the new product.

3. The product demand forecasting system of claim 2, wherein the demand normalization and average profile determination module normalizes the demand profiles of the similar products for lengths of life and total lifecycle demands.

4. The product demand forecasting system of claim 2, wherein the demand normalization and average profile determination module averages the normalized demand profiles by
- discretizing each profile at a pre-specified number of equidistant points between the beginning and end of the life-cycle of each demand profile; and
- calculating an empirical mean and an empirical standard deviation of the demand profiles of the similar products at these equidistant points to yield an averaged demand profile as the demand profile of the new product.

5. The product demand forecasting system of claim 4, wherein the demand normalization and average profile determination module also estimates variance information of the normalized and averaged demand profiles.

6. The product demand forecasting system of claim 1, further comprising an updating module that provides a revised new total life-cycle demand estimate using (1) the total life-cycle demand of the similar product, (2) the demand profile of the new product, and (3) past demand information, when available, of the new product.

7. The product demand forecasting system of claim 6, wherein the forecast creator is also coupled to the updating module such that if the forecast creator receives the revised new total life-cycle demand estimate, the forecast creator uses the revised new total life-cycle demand estimate instead of the total life-cycle demand from the life-cycle demand predictor to calculate the life-cycle demand forecast.

8. A method of providing a life-cycle product demand forecast for a new product yet to be introduced, comprising
- collecting historical demand data of similar products of the new product, wherein the similar products have already been introduced;
- generating demand profiles of the similar products based on the historical data of the similar products;
- normalizing and averaging the demand profiles of the similar products to obtain a demand profile of the new product;
- generating a total life-cycle demand of the new product based on the historical demand data of the similar products; and
- generating the life-cycle product demand forecast for the new product based on the demand profile and total life-cycle demand of the new product;
- wherein generating the total life-cycle demand of the new product comprises calculating an average demand per time period of each of the similar products, associating each average demand per time period with a date that represents the midpoint of the life-cycle of each product, and using the average demand profile per time period at the midpoint of the life-cycle of each similar product to calculate an estimate of the average demand per time period at a midpoint of the life cycle of the new product.

9. The method of claim 8, wherein normalizing and averaging the demand profiles averages all the normalized demand profiles by
- discretizing each profile at a pre-specified number of equidistant points between the beginning and end of the life-cycle;
- calculating an empirical mean and an empirical standard deviation of all the profiles at the equidistant points to yield an averaged demand profile as the demand profile of the new product.

10. The method of claim 8, wherein normalizing and averaging the demand profiles further comprises estimating variance information of the normalized and averaged demand profiles.

11. The method of claim 8, further comprising
- determining if past demand information of the new product is available;
- providing a revised new total life-cycle demand estimate using (1) the total life-cycle demand of the similar product, (2) the demand profile of the new product, and (3) the past demand information of the new product.

* * * * *